INVENTOR.
JOHN. H. NORTH.
ATTORNEY.

Patented Nov. 28, 1939

2,181,737

UNITED STATES PATENT OFFICE 2,181,737

CONTINUOUS MOLDING MACHINE

John H. North, Seattle, Wash.

Application October 26, 1938, Serial No. 237,054

6 Claims. (Cl. 107—8)

My invention relates to improvements in continuous molding machines which are particularly adapted for making meat balls and the like. The objects of the invention are to provide means by which plastic food products may be continuously and rapidly molded, whereby the machine can be thoroughly cleansed after use by the introduction of steam, and whereby the parts may be suitably lubricated.

The invention consists essentially of a pair of rollers having opposing peripheral pockets adapted to be filled with material and rotating means for breaking the adhesion of the material to the pocket surfaces and for ejecting the material molded therein, as will be more fully described in the following specification and shown in the accompanying drawing, in which—

In the drawing like characters of reference indicate corresponding parts in each figure.

Figure 1:
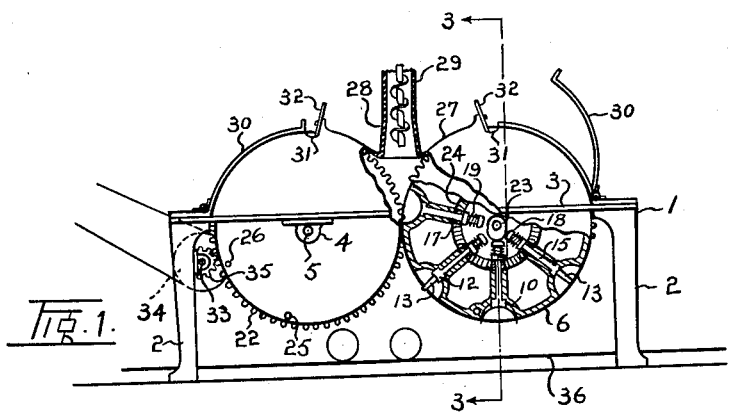
Fig. 1 is a side elevational view of the invention showing parts in section.
Figure 2:
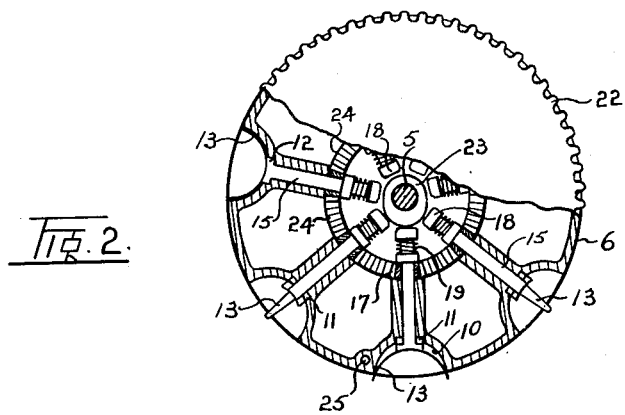
Fig. 2 is a part sectional view through one of the coacting rollers.
Figure 3:
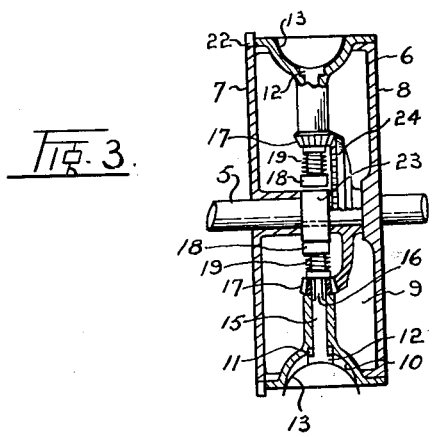
Fig. 3 is a transverse sectional view taken on the line 3—3 of Figure 1.

The numeral 1 indicates a frame consisting of legs 2, supporting a base 3 from which two pairs of bearings 4 are carried. In the bearings 4 two non-rotating shafts 5 are mounted, upon each of which is a roller 6. The rollers 6 consist of two complementary half portions 7 and 8 which are suitably bolted together to define a central cavity 9. Each roller is provided upon its periphery with a plurality of spaced semi-spherical pockets 10 having a central recess 11 into which the boss 12 of a spring fork 13 is seated during a portion of the rotation of the rollers. The forks 13 are normally curved to a slightly greater radius than the pockets in which they are mounted, so as to spring outwardly at their outer ends as they are moved outwardly from said pockets to release the ball of material which they have contacted with. The boss 12 of each of the forks 13 is mounted upon a radial shaft 15 which is splined adjacent its inner end as at 16 and is fitted with a splined bevelled pinion 17. Fitted at the inner end of the shaft 15 is a cap 18 between which and the pinion 17 a spring 19 is fitted for the purpose of returning the shaft 15 and its fork 13 to their inner position with the fork wholly within its pocket 10.

One face of each roller 6 is provided with a gear ring 22 having a pitch diameter equal to that of its roller. These two gear rings mesh with each other so that as said rollers turn, their respective pockets 10 will meet to form substantially spherical molds in which the material is to be compressed.

Secured upon each of the shafts 5 is a cam 23 which is engaged by each of the caps 18 of a roller as the shafts 15 dip below the horizontal axis of said roller to thrust the forks 13 outwardly and cause the material ball molded in the corresponding pocket to drop. Fixedly mounted on each shaft 5 adjacent the cam 23 is a bevelled gear 24 which meshes with each of the bevelled pinions 17 within the roller, causing them to rotate continuously during the rotation of the roller.

Plugged and threaded apertures 25 and 26 respectively are formed in one side wall of each roller 6, the aperture 25 being of such size as to permit the connection of a steam hose to the roller to clean its interior, and the aperture 26 is designed as a filler for admitting oil to the interior of the roller to lubricate its working parts.

Formed upon the top of the base 3 is a housing 27 which covers the upper portion of the rollers 6 and defines a feed chamber 28 having a feed pipe 29, which latter is obviously connected to a suitable source of supply, not shown. A pair of hinged covers 30 are provided at opposite ends of the housing to give access to the upper periphery of the rollers, and intermediate said doors and the feed chamber, but spaced therefrom by the gap 31, is a pair of scrapers 32 which serve to prevent any adherent material from being returned to the feed chamber on the periphery of the rollers.

As a convenient means of driving the rollers, a shaft 33 is journalled between a pair of the legs 2, which is fitted at one end with a suitable pulley 34 and adjacent the other end with a pinion 35 meshing with one of the gear rings 22.

An endless conveyor 36 is provided under the base 3 to receive the finished product.

The operation of the machine for making meat balls is as follows:

With the rollers 6 rotating, chopped meat is forced into the feed chamber 28 and from thence into the pockets 10 as they come into the feed chamber zone. As two complementary pockets roll together, the meat contacting the adjacent periphery of the rollers is squeezed away leaving the opposing pockets filled with a ball of meat. During the rotation of the rollers the forks 13 in all the pockets will be in constant rotation, since the pinions 17 on the radial shafts 15 are travelling around the fixed bevelled gear 24. As soon as a pair of pockets pass below the horizontal centre of the rollers 6 the forks 13 within those two pockets will be urged radially outwards by the cam 23, thus thrusting the meat balls outwardly as the forks recede from each other, the forks being of spring material open slightly as they project from their cups, thus releasing the meat balls to allow them to fall onto the conveyor 36. The forks are caused to recede into their pockets under the influence of the springs 19 after they have passed beyond the lower end of the vertical axis of the rollers.

To clean the machine, the apertures 25 and 26 are unplugged and steam is introduced to the interior of the rollers. After cleansing, the aperture 25 is plugged and vegetable oil is introduced to a predetermined level for lubricating the several parts.

Access to the periphery of the rollers is obtained by opening the hinged covers 30.

What I claim as my invention is:

1. A molding machine for meat balls and the like comprising a pair of rollers mounted to rotate in unison with their peripheries in contact, said peripheries being provided with complementary pockets, a feed chamber between and above the rollers, a fork rotatably mounted in each pocket, and means incidental to the rotation of the rollers for imparting continuous rotation to the forks within their respective pockets.

2. A molding machine for meat balls and the like comprising a pair of rollers mounted to rotate in unison with their peripheries in contact, said peripheries being provided with complementary pockets, a feed chamber between and above the rollers, a fork within each pocket, said fork being fitted upon a shaft extending radially of its roller, and means incidental to the rotation of the rollers for imparting continuous rotation to the fork shaft.

3. A molding machine for meat balls and the like comprising a pair of rollers mounted to rotate in unison with their peripheries in contact, said peripheries being provided with complementary pockets, a feed chamber between and above the rollers, a fork in each pocket mounted upon a shaft radial to its roller, and means incidental to the rotation of the roller for imparting continuous rotation to the forks, and means for imparting reciprocal endwise movement to the forks during a portion of their rotation about the axes of their respective rollers.

4. A molding machine for meat balls and the like comprising a pair of rollers mounted to rotate in unison with their peripheries in contact, said peripheries being provided with complementary pockets, a feed chamber between and above the rollers, a fork within each pocket, said fork being fitted upon an endwise movable shaft extending radially of its roller, means for imparting continuous rotation to the fork shafts, and means for imparting endwise reciprocable movement to said shafts and forks to withdraw the forks into their respective pockets prior to filling and project said forks when disposed below the axis of their rollers.

5. A molding machine for meat balls and the like comprising a pair of rollers adapted to be rotated in unison about a pair of fixed shafts, said rollers being disposed with their peripheries contacting, said peripheries being provided with complementary pockets, a feed chamber between and above the rollers, a non-rotating cam on each fixed shaft, a radial shaft extending to the base of each pocket and a fork carried by each shaft, one end of said radial shaft being resiliently urged into contact with the cam to draw the fork into its pocket, said cam serving to project each fork outwardly from the pocket on each rotation of the roller.

6. A molding machine for meat balls and the like as claimed in claim 5, a pinion mounted upon each radial shaft, a bevelled gear secured to the fixed shaft and in mesh with the pinions to impart continuous rotation to the radial shafts and their forks as the rollers are rotated about their fixed shafts.

JOHN H. NORTH.